United States Patent
Birke

(10) Patent No.: US 10,280,085 B2
(45) Date of Patent: May 7, 2019

(54) PROCESS AND PLANT FOR PREPARING NITRIC ACID

(71) Applicants: ThyssenKrupp Industrial Solutions AG, Essen (DE); thyssenkrupp AG, Essen (DE)

(72) Inventor: Daniel Birke, Dortmund (DE)

(73) Assignees: THYSSENKRUPP INDUSTRIAL SOLUTION AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/782,158

(22) Filed: Oct. 12, 2017

(65) Prior Publication Data
US 2018/0105419 A1   Apr. 19, 2018

(30) Foreign Application Priority Data
Oct. 17, 2016   (DE) .................. 10 2016 220 184

(51) Int. Cl.
*C01B 21/38*   (2006.01)
*C02F 1/04*   (2006.01)
(Continued)

(52) U.S. Cl.
CPC ............. *C01B 21/38* (2013.01); *B01D 53/00* (2013.01); *B01D 53/8625* (2013.01); *B01J 7/00* (2013.01);
(Continued)

(58) Field of Classification Search
CPC .... B01D 53/00; B01D 53/8625; B01D 53/56; B01D 53/74; B01D 53/75;
(Continued)

(56) References Cited

U.S. PATENT DOCUMENTS 3,900,554 A   8/1975   Lyon
3,991,167 A   2/1976   Depommier
(Continued)

FOREIGN PATENT DOCUMENTS

CN   104709954 A   6/2015
DE   69304318 T   3/1997
(Continued)

OTHER PUBLICATIONS

English Abstract of CN104709954A.

*Primary Examiner* — Timothy C Vanoy
(74) *Attorney, Agent, or Firm* — thyssenkrupp North America, Inc.

(57) ABSTRACT

A process for preparing nitric acid may involve vaporizing ammonia in at least one first ammonia vaporizer to produce an ammonia gas, oxidizing this ammonia gas to nitrogen dioxide in a plant section of a nitric acid plant, and absorbing the nitrogen dioxide in water to produce nitric acid. A residual gas containing nitrous gases may be taken off from the plant section of the nitric acid plant and conveyed to a residual-gas cleaning apparatus. The residual gas containing nitrous gases may be reduced by means of ammonia in the residual-gas cleaning apparatus, wherein ammonia-containing wastewater obtained in the at least one first ammonia vaporizer may be conveyed to the residual-gas cleaning apparatus. Such a process may eliminate or at least substantially reduce ammonia-containing wastewater. Furthermore, a plant can be used in this process for preparing nitric acid.

19 Claims, 3 Drawing Sheets

(51) Int. Cl.
*C01C 1/12* (2006.01)
*B01D 53/00* (2006.01)
*B01J 7/00* (2006.01)
*B01D 53/86* (2006.01)
*C01B 21/26* (2006.01)
*C01B 21/28* (2006.01)

(52) U.S. Cl.
CPC ............ *C01B 21/262* (2013.01); *C01B 21/28* (2013.01); *C01C 1/12* (2013.01); *C02F 1/04* (2013.01)

(58) Field of Classification Search
CPC ...... B01D 2251/2062; B01D 2257/402; B01D 2257/404; B01J 7/00; C01B 21/38; C01B 21/28; C01B 21/262; C01B 21/40; C02F 1/04
See application file for complete search history.

(56) References Cited

U.S. PATENT DOCUMENTS

| | | | |
|---|---|---|---|
| 4,081,511 A * | 3/1978 | Laue | B01D 53/8625 423/239.1 |
| 4,115,516 A * | 9/1978 | Takami | B01D 53/56 423/239.1 |
| 4,219,536 A * | 8/1980 | Hoenke | B01D 53/56 423/393 |
| 4,726,302 A | 2/1988 | Hein | |
| 6,890,501 B2 * | 5/2005 | Delahay | B01D 53/8625 423/239.2 |
| 6,991,771 B2 * | 1/2006 | Duncan | B01D 53/32 423/235 |
| 7,951,742 B2 * | 5/2011 | Chen | B01D 53/8625 423/239.1 |
| 9,738,521 B2 * | 8/2017 | Schwefer | B01D 53/8628 |
| 2013/0336872 A1 * | 12/2013 | Schwefer | B01D 53/8628 423/392 |
| 2014/0377157 A1 | 12/2014 | Birke | |
| 2015/0004091 A1 | 1/2015 | Birke | |
| 2015/0098881 A1 | 4/2015 | Perbandt | |
| 2016/0039674 A1 | 2/2016 | Schwefer | |
| 2017/0197178 A1 | 7/2017 | Perbandt | |
| 2017/0227129 A1 | 8/2017 | Birke | |

FOREIGN PATENT DOCUMENTS

| | | | | |
|---|---|---|---|---|
| DE | 102011122142 A | | 6/2013 | |
| DE | 102012000570 A | | 7/2013 | |
| DE | 102012010017 A | | 11/2013 | |
| DE | 102013004341 A | | 9/2014 | |
| DE | 102014210661 A | | 12/2015 | |
| DE | 102014214685 A | | 1/2016 | |
| EP | 0232976 A | | 8/1987 | |
| FR | 2 789 911 A1 * | | 8/2000 | ........ B01D 53/8625 |
| GB | 434 302 A * | | 8/1935 | ............ B01D 53/56 |
| GB | 900 945 A * | | 7/1962 | .......... B01D 53/8625 |
| GB | 2246121 A | | 1/1992 | |
| JP | S 5613494 B2 * | | 3/1981 | ............ B01D 53/56 |
| WO | 2005082779 A | | 9/2005 | |

* cited by examiner

PROCESS AND PLANT FOR PREPARING NITRIC ACID

CROSS-REFERENCE TO RELATED APPLICATION

This application is a non-provisional application claiming priority to German Patent Application No. DE 10 2016 220 184.0, which was filed Oct. 17, 2016, the entire contents of which are hereby incorporated by reference herein.

FIELD

The present disclosure generally relates to nitric acid, including processes for preparing nitric acid and plants for preparing nitric acid.

BACKGROUND

In the production of nitric acid, for example, ammonia is oxidized to nitrogen monoxide over platinum gauzes and in the subsequent operation is oxidized by (atmospheric) oxygen to form nitrogen dioxide. The nitrogen dioxide in the course of the operation is cooled down and absorbed in water in counter-current in an absorber, to form nitric acid.

For this procedure, ammonia is vaporized in an ammonia vaporizer and is mixed with process air upstream of the oxidation reactor. Because the ammonia used does not consist 100% of ammonia, but generally has a water fraction usually in the order of magnitude of around 0.2% to about 0.5%, water accumulates within the ammonia vaporizer. This results in a pressure drop in the ammonia vaporizer, thereby lowering the pressure needed for the inward feeding for the process air.

In order to increase the pressure in the ammonia vaporizer, the water must be removed. In accordance with the prior art, the water is removed by continuous or discontinuous draining/desludging of ammonia from the ammonia vaporizer into the ammonia stripper. As a consequence of this operation, not only water but also ammonia is drained/desludged into the ammonia stripper. The ammonia content of the liquid which is drained from the ammonia vaporizer into the ammonia stripper is generally between about 60% and about 100%. In the ammonia stripper, the ammonia is then stripped with steam from the water/ammonia mixture and is supplied to the operation. The ammonia stripper operates under virtually the same pressure as the ammonia vaporizer. This leaves a solution consisting of more than about 80% of water. The remainder is ammonia. After the stripping procedure, this liquid (water/ammonia mixture) is moved into an atmospheric "knock-out drum." In the atmospheric knock-out drum, a portion of the ammonia is vaporized again, owing to the lower pressure level by comparison with the ammonia stripper, and is supplied via a chimney to the atmosphere. The water, which has a low ammonia content, is subsequently supplied from the knock-out drum to a disposal vessel or to a wastewater purification facility. The ammonia-containing water must be disposed of in accordance with the conditions for environmental protection. This is accomplished, for example, by supplying the disposal container to a refuse incineration plant.

Because the absorber in a nitric acid plant does not carry out 100% absorption of the nitrous gases, there are still nitrous gases in the residual gas from a nitric acid plant. These gases are generally supplied to a residual-gas cleaning facility. The residual-gas cleaning facility used is typically a DeNOx or an EnviNOx® system. The catalytic reaction for reducing the nitrous gases in the residual gas (DeNOx or EnviNOx®) requires ammonia. This is generally supplied, parallel to the process-side ammonia vaporization, to an ammonia vaporizer for residual-gas cleaning, where it is vaporized before being added to the residual-gas stream or the residual-gas cleaning facility.

Thus a need exists to provide a process for preparing nitric acid, having the features of the generic process specified above, in which ammonia-containing wastewater requiring removal from the system is no longer produced, or in which the amount of ammonia-containing wastewater is at least substantially reduced.

DETAILED DESCRIPTION

Figure 1:
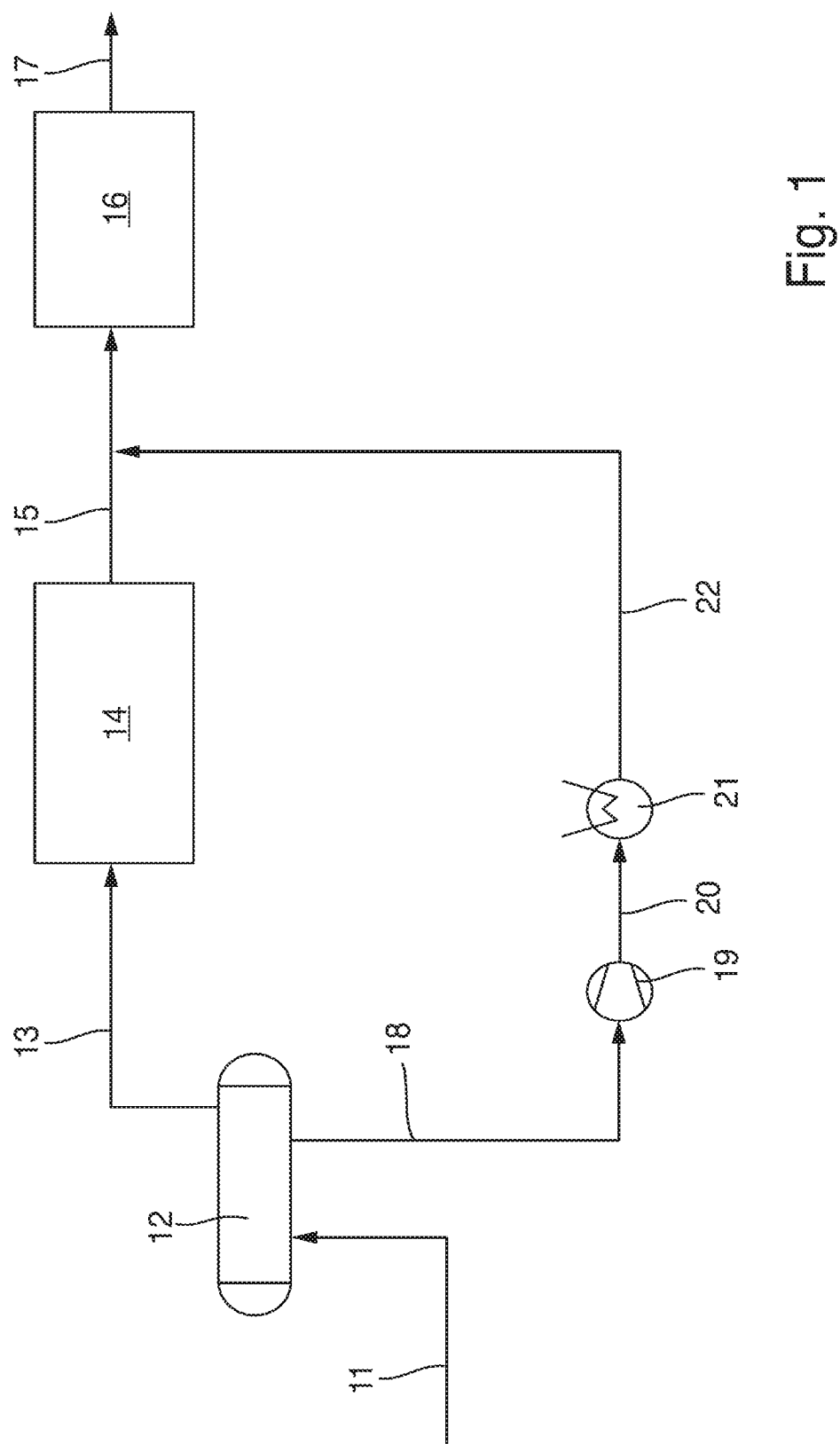
FIG. 1 is a flow diagram of an example plant according to a first exemplary variant embodiment.

Although certain example methods and apparatus are described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for preparing nitric acid. In one such example process, nitric acid may be prepared by first vaporizing ammonia in at least one first ammonia vaporizer to produce an ammonia gas, oxidizing this ammonia gas to nitrogen dioxide in a nitric acid plant and thereafter absorbing the nitrogen dioxide in water to produce nitric acid, with a residual gas containing nitrous gases being taken off from the nitric acid plant and conveyed to a residual-gas cleaning apparatus, and the residual gas containing nitrous gases being reduced by means of ammonia in the residual-gas cleaning apparatus. The present disclosure further relates to plants for preparing nitric acid.

In accordance with the present disclosure, ammonia-containing wastewater obtained in at least one first ammonia vaporizer or otherwise may be conveyed to the residual-gas cleaning apparatus. At this point there may be one, two or more first ammonia vaporizers used, disposed for example in series. Accordingly, the ammonia-containing wastewater remains within the system, and the ammonia fraction contained within this wastewater stream can be used in the residual-gas cleaning apparatus of the nitric acid plant in order to reduce the nitrous gases that are obtained therein.

The concept of ammonia-containing wastewater obtained otherwise means that it is also possible for ammonia-containing wastewater obtained outside the plant system— that is, in a different plant, for example an ammonium nitrate plant or the like—to be fed into the system and supplied to the residual-gas cleaning apparatus of the nitric acid plant.

In contrast to conventional plants, the ammonia from the at least one first ammonia vaporizer is not first supplied to an ammonia stripper, with the stripped ammonia water then being removed from the system; instead, the ammonia-containing wastewater may be supplied to the offgas cleaning facility of a nitric acid plant. In the case of single-pressure plants (medium-pressure process, high-pressure process, atmospheric process), this may take place directly or with the aid of a pump. In the case of the two-pressure process, the pressure of the ammonia from the ammonia vaporizer may be increased to the pressure required for residual-gas cleaning, by means of a pump or via other suitable technical process means, for example, and the pressurized ammonia may then be supplied to a further ammonia vaporizer for the cleaning of residual gas. In the residual-gas cleaning facility, the ammonia acts as a reducing agent for the nitrous gases, and is broken down in the process.

In some examples, the ammonia-containing wastewater may be supplied either to a line upstream of the residual-gas cleaning apparatus or to the residual-gas cleaning apparatus directly.

The ammonia-containing wastewater may be preferably supplied from the at least one first ammonia vaporizer to at least one further ammonia vaporizer, where it may be vaporized and supplied as ammonia gas upstream of the residual-gas cleaning apparatus or to the residual gas-cleaning apparatus directly.

As already mentioned, the ammonia-containing wastewater from the at least one first ammonia vaporizer, particularly in the case of two-pressure processes, may be moved by means of a pump or via other suitable technical process means to the residual-gas cleaning apparatus, and/or brought to an elevated pressure before being supplied to the residual-gas cleaning apparatus.

In some examples, it may be also possible for the ammonia-containing wastewater from the at least one first ammonia vaporizer to be first supplied to an ammonia stripper, in which a portion of gaseous ammonia may be removed and supplied to the nitric acid plant, with the wastewater from the ammonia stripper being supplied to a further ammonia vaporizer, where it may be vaporized and supplied as ammonia gas to the residual-gas cleaning apparatus. In these examples, therefore, there is the advantage that ammonia present in the ammonia-containing wastewater, following removal in the ammonia stripper, can be supplied as a reactant to the nitric acid plant, thereby allowing a higher process yield to be achieved. It may be also possible to use a plurality of ammonia strippers rather than one, with these strippers being connected, for example, in series.

With this variant as well, it may be possible optionally to operate without using a pump. Where, however, the process is a two-pressure process, for example, it may again be advantageous if the ammonia-containing wastewater from the ammonia stripper is moved by means of a pump to the residual-gas cleaning apparatus and/or brought to an elevated pressure before being supplied to the residual-gas cleaning apparatus.

In the event that at least one ammonia stripper is used, two ammonia-containing wastewater streams are obtained: firstly that from the at least one first ammonia vaporizer, and secondly the stream of ammonia-containing wastewater from the at least one ammonia stripper. In this case, both sub-streams, namely the ammonia-containing wastewater from the at least one first ammonia vaporizer and the ammonia-containing wastewater from the at least one ammonia stripper, can be combined to form a common stream and supplied to a further ammonia vaporizer, where they can be vaporized and supplied as ammonia gas to the residual-gas cleaning apparatus. An additional possibility, optionally, is to admix fresh ammonia to the common wastewater stream.

In the case of the variant with ammonia stripper and therefore with two or more sub-streams, moreover, it may be of advantage to move the ammonia-containing wastewater from the at least one first ammonia vaporizer by means of a first pump to a further ammonia vaporizer and/or to bring it to an elevated pressure, and to move the ammonia-containing wastewater from the ammonia stripper by means of a further pump to the further ammonia vaporizer and/or to bring it to an elevated pressure, before the ammonia-containing wastewater from the at least one first ammonia vaporizer is supplied together with the ammonia-containing wastewater from the ammonia stripper and optionally with fresh ammonia to the residual-gas cleaning apparatus.

The present disclosure makes it possible to reduce the volume of wastewater by at least 50%, for example, and at maximum by up to 100%, meaning that there is no longer any ammonia-containing wastewater obtained that requires disposal. The degree of reduction in wastewater is dependent on the purity of the ammonia added to the ammonia vaporizer.

A further advantage of the present disclosure may be that the ammonia consumption during the nitric acid process is reduced, because less ammonia or no ammonia leaves the plant in the form of wastewater.

A further alternative possibility is that of supplying ammonia from the ammonia vaporizer to an ammonia stripper and supplying the stripped liquid, with or without a pump, to the ammonia vaporizer of the residual-gas cleaning facility and therefore to a DeNOx or EnviNOx® system. In the case of single-pressure plants (medium-pressure process, high-pressure process, atmospheric process), this may take place directly or with the aid of a pump. In the case of the two-pressure process, the pressure of the ammonia from the ammonia stripper is raised to the required pressure by means of a pump, for example, and it may be supplied to the further ammonia vaporizer for residual-gas cleaning. In the residual-gas cleaning facility, the ammonia is broken down as a reducing agent.

A further alternative possibility is that of supplying ammonia from the ammonia vaporizer to an ammonia stripper, and the stripped liquid, with or without a pump, may be mixed with the ammonia for the ammonia vaporizer of the residual-gas cleaning facility and is therefore supplied to a DeNOx or EnviNOx® system. In the case of one-pressure plants (medium-pressure process, high-pressure process, atmospheric process), this may take place directly or with the aid of a pump. In the case of the two-pressure process, the pressure of the ammonia from the ammonia vaporizer may be raised to the required pressure by means of a pump, and it may be supplied to the ammonia for the further ammonia vaporizer for residual-gas cleaning. In the residual-gas cleaning facility, the ammonia may be broken down as a reducing agent.

A further subject of the present disclosure is a plant for preparing nitric acid, which in some examples may comprise at least one first ammonia vaporizer, in which ammonia may be vaporized to produce an ammonia gas, and further comprising a plant section of the nitric acid plant, which is in functional communication with the at least one first ammonia vaporizer and in which this ammonia gas is oxidized, for example over platinum gauzes, to nitrogen monoxide and in the following process, for example by (air) oxygen, to nitrogen dioxide, and the nitrogen dioxide is thereafter absorbed in water to produce nitric acid, and also comprising a residual-gas cleaning apparatus which is disposed downstream of the plant section of the nitric acid plant cited and is in functional communication therewith, and to which a residual gas containing nitrous gases is conveyed from the plant section of the nitric acid plant, and in which the residual gas containing nitrous gases is reduced by means of ammonia, wherein a line, originating on the output side from the at least one first ammonia vaporizer, for ammonia-containing wastewater obtained in the at least one first ammonia vaporizer which opens, upstream before the residual-gas cleaning apparatus, into a line to the residual-gas cleaning apparatus, or leads directly to the residual-gas cleaning apparatus, is provided.

The aforesaid example plant has the advantage that the ammonia-containing wastewater, instead of being taken off from the process, can be supplied via the stated line to the residual-gas cleaning apparatus.

In some examples of the present disclosure, at least one further ammonia vaporizer may be disposed in the line which opens into the line to the residual-gas cleaning facility or leads directly to the residual-gas cleaning apparatus. By means of this further ammonia vaporizer, the ammonia, including the wastewater, may be evaporated, and can be conveyed accordingly as ammonia gas to the residual-gas cleaning apparatus.

In some examples, at least one pump may be disposed in the line upstream of the further ammonia vaporizer. A pump of this kind or an equivalent process-engineering means may be especially advantageous when the process is a two-pressure process, so that the liquid ammonia wastewater and hence the gas can be brought to the required pressure for the residual-gas cleaning apparatus.

The plant may further comprise at least one ammonia stripper, which can be disposed in the flow path of the line between the at least one first ammonia vaporizer and the residual-gas cleaning apparatus. The liquid stripped in this stripper may be supplied, with or without a pump, to the further ammonia vaporizer and, following vaporization, may be conveyed as ammonia gas to the residual-gas cleaning apparatus.

In some examples, there may be on the output side, from the at least one first ammonia vaporizer, a first line for ammonia-containing wastewater, which leads to the further ammonia vaporizer, and on the output side, from the at least one first ammonia vaporizer, there may be a further line for ammonia-containing wastewater, which leads to at least one ammonia stripper, wherein on the output side, from the ammonia stripper, there may be a line for ammonia-containing wastewater that leads to the residual-gas cleaning apparatus. This variant allows both the ammonia-containing wastewater from the first ammonia vaporizer to be utilized, and also the ammonia-containing wastewater which leaves the ammonia stripper, with the two sub-streams being able to be combined, thereafter vaporized again, preferably, and finally conveyed to the residual-gas cleaning apparatus. In another variant, fresh ammonia may additionally be admixed to the common wastewater stream, for example.

Therefore, according to some examples of the present disclosure, the line from the at least one first ammonia vaporizer and the output-side line from the ammonia stripper preferably open out into a common line for ammonia-containing wastewater, which leads to the residual-gas cleaning apparatus.

A further subject of the present disclosure concerns using a plant having the above-described features in processes of the present disclosure for preparing nitric acid.

With reference now to FIG. 1, a first exemplary embodiment of the present disclosure is elucidated in more detail. Liquid ammonia may be fed via an inlet line 11 into an ammonia vaporizer 12. In this ammonia vaporizer 12, the liquid ammonia is vaporized and then, via a line 13 starting from this ammonia vaporizer 12 on the output side, gaseous ammonia may be passed to a further plant section of the nitric acid plant, 14. In this plant section 14 of the nitric acid plant, the ammonia may be oxidized catalytically first to nitrogen monoxide and subsequently further to nitrogen dioxide. The nitrogen dioxide may then be absorbed in counter-current in water in an absorber, to form nitric acid. Since this process of nitric acid production from ammonia is known in principle, it is not elucidated in any more detail here.

Because the absorber of the nitric acid plant does not carry out 100% absorption of the nitrous gases, nitrous gases are found in the residual gas from the nitric acid plant 14. This residual gas may be supplied via a line 15 to a residual-gas cleaning apparatus 16, in which, in general, the nitrous gases in the residual gas are subjected to catalytic reduction by means of ammonia. After cleaning, the residual gas can then be removed from the system via the line 17.

In accordance with the present disclosure, ammonia-containing water in the liquid state may be removed from the ammonia vaporizer 12 via a line 18 and may be supplied to a further ammonia vaporizer 21, with the line 18 optionally including a pump 19 disposed therein that supplies the ammonia water via the line 20 to the aforesaid further ammonia vaporizer 21. The ammonia gas vaporized in the further ammonia vaporizer 21 may then be conveyed off via a line 22, which opens into the line 15, via which the residual gas may be supplied from the plant section 14 of the nitric acid plant to the residual-gas cleaning apparatus 16.

Below, with reference to FIG. 2, a second exemplary embodiment of the present disclosure is elucidated. Corresponding components already described above for the variant of FIG. 1 are given the same reference numerals in FIG. 2. These components are the inlet line 11 leading to the first ammonia vaporizer 12, the output-side line 13 from this ammonia vaporizer 12 to the plant section 14 of the nitric acid plant, and the line 15 from the plant outlet to the residual-gas cleaning apparatus 16.

Figure 2:
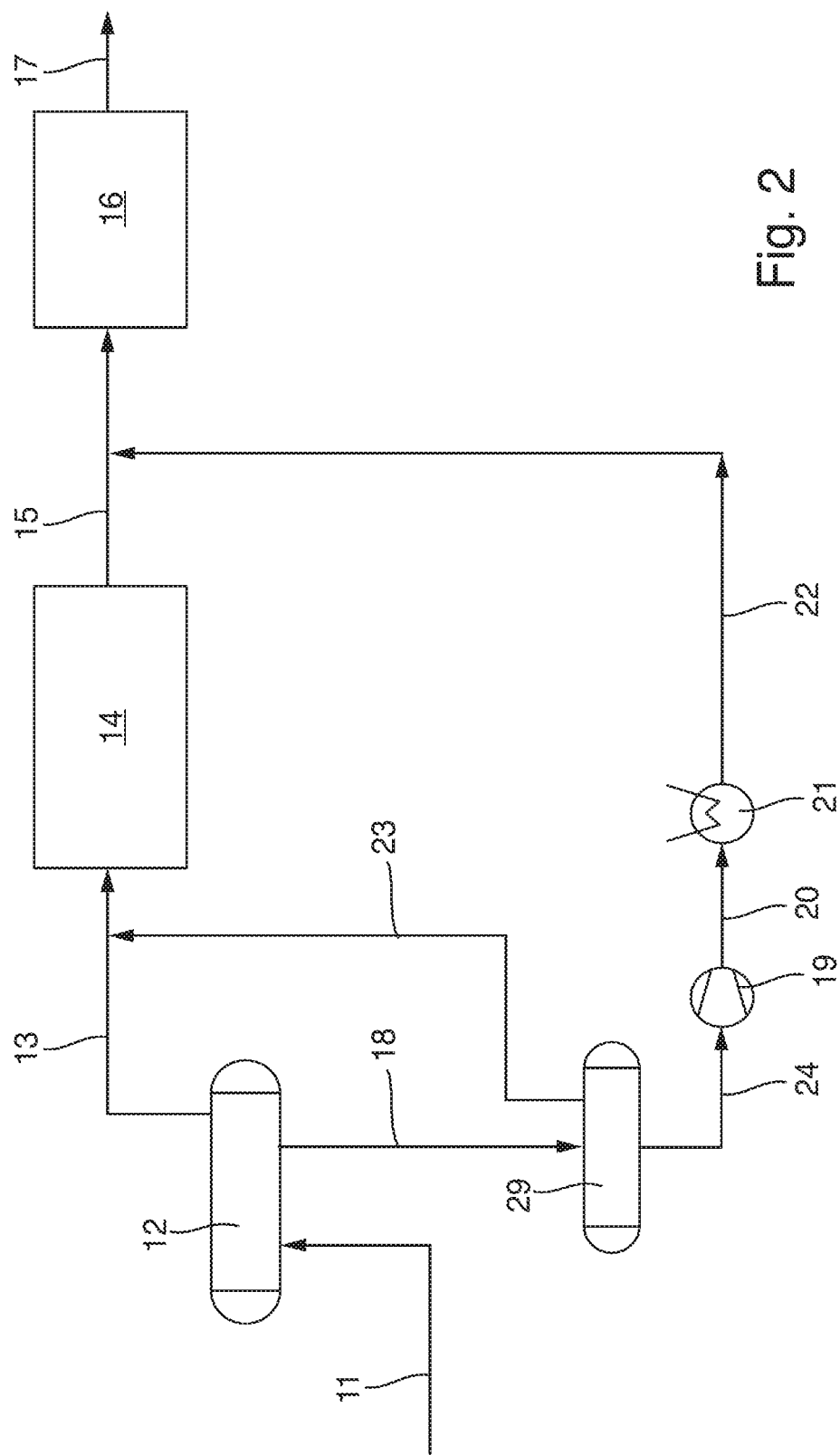
FIG. 2 is a flow diagram of an example plant according to a second exemplary variant embodiment.

The variant of FIG. 2 differs from that according to FIG. 1, however, in that the line 18 by means of which ammonia-containing wastewater is taken off from the first ammonia vaporizer 12 leads to an ammonia stripper 29, in which the ammonia-containing wastewater is stripped. In this ammonia stripper 29, a portion of ammonia gas may be recovered, which can then be supplied via the line 23 to the nitric acid plant 14. The ammonia-containing wastewater from the ammonia stripper 29, in contrast, may be supplied again via the output-side line 24, optionally with the assistance of a pump 19, via the line 20 to the further ammonia vaporizer 21, from which an ammonia gas can be supplied via the line 22 to the residual-gas cleaning apparatus 16.

Below, with reference to FIG. 3, a third exemplary embodiment of the present disclosure is elucidated. In the case of this variant, as for the exemplary embodiments described above, there is an ammonia vaporizer 12, from which the gas reaches the plant section 14 of the nitric acid plant via the line 13. The residual gas from the nitric acid plant may be again conveyed via the line 15 to the residual-gas cleaning apparatus 16. Similarly to the case with the variant according to FIG. 2, the variant of FIG. 3 also has an ammonia stripper 29 provided, which may be supplied via the line 18 with the ammonia containing wastewater from the first ammonia vaporizer 12. The ammonia gas recovered in the ammonia stripper 29 may be supplied via the line 23 to the nitric acid process.

Figure 3:
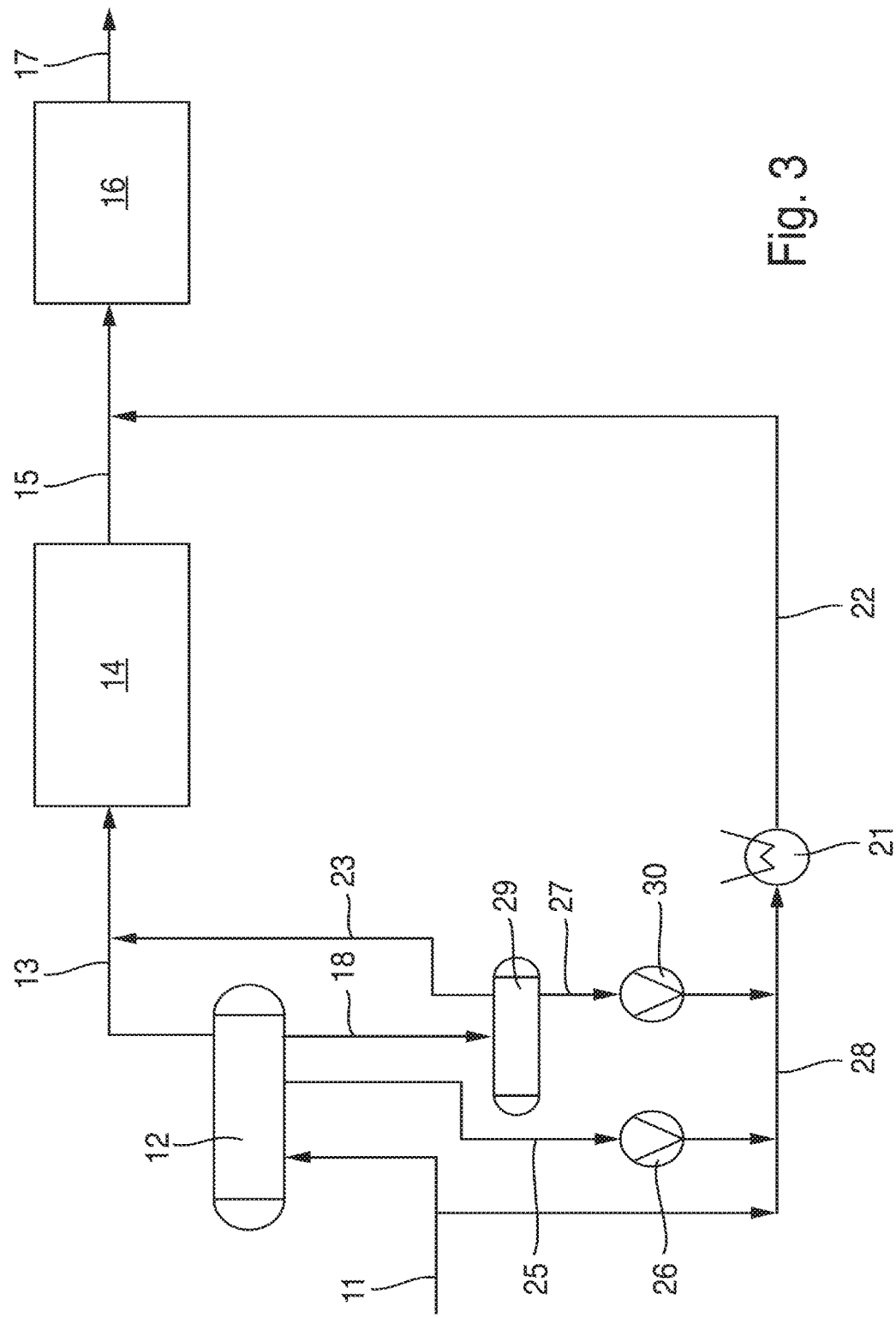
FIG. 3 is a flow diagram of still another example plant according to a third exemplary variant embodiment.

In contrast to the variants described above, provision is made, with the exemplary embodiment according to FIG. 3, for, on the one hand, ammonia-containing wastewater to be passed to the further ammonia vaporizer 21 from the ammonia stripper 29, on the output side, via a first line 27. Optionally, however, from the first ammonia vaporizer 12, on the output side too, via a further line 25, a sub-stream of ammonia-containing wastewater is not passed to the ammonia stripper 29, but is instead conveyed past it, and, optionally with the aid of a further pump 26, this sub-stream may be conveyed to a line 28 which leads to the further ammonia vaporizer 21, from which the ammonia gas on the output side can then be supplied to the residual-gas cleaning apparatus 16 via the line 22, which opens into the line 15. Alternatively, the ammonia gas from the line 22 can be supplied directly to the residual-gas cleaning apparatus 16. In that case there are two sub-streams of ammonia-containing wastewater, specifically coming in one instance via the line 25 from the ammonia vaporizer 12 and in another instance via the line 27 from the ammonia stripper 29. In the line 27 there may likewise be a pump 30 disposed for the purpose, as and when required, of assisting the conveying operation or for increasing the pressure. These two sub-streams via the lines 25 and 27, respectively, are then combined to a common stream of ammonia-containing wastewater in the line 28 into which they open, and this combined stream may then be supplied via the line 28 to the further ammonia vaporizer 21, where it may be vaporized. Optionally, fresh ammonia from the line 11 can be fed in additionally to the line 28.

LIST OF REFERENCE NUMERALS 11 inlet line
12 ammonia vaporizer
13 output-side line ammonia vaporizer
14 plant section of the nitric acid plant
15 line
16 residual-gas cleaning apparatus
17 line
18 line
19 pump
20 line
21 ammonia vaporizer
22 line
23 line for ammonia gas from the ammonia stripper
24 line from the outlet of the ammonia stripper to the pump
25 line for sub-stream
26 pump
27 line for sub-stream
28 line for combined stream to the further ammonia vaporizer
29 ammonia stripper
30 pump

What is claimed is:

1. A process for preparing nitric acid comprising:
vaporizing ammonia in an ammonia vaporizer to produce an ammonia gas;
oxidizing the ammonia gas to nitrogen dioxide in a plant section of a nitric acid plant;
absorbing the nitrogen dioxide in water to produce nitric acid;
taking off a residual gas containing nitrous gases from the plant section of the nitric acid plant;
conveying the residual gas to a residual-gas cleaning apparatus;
conveying ammonia-containing wastewater to the residual-gas cleaning apparatus; and
reducing the residual gas by way of ammonia in the residual-gas cleaning apparatus.

2. The process of claim 1 wherein the ammonia-containing wastewater is supplied to a line upstream of the residual-gas cleaning apparatus or to the residual-gas cleaning apparatus directly.

3. The process of claim 1 wherein the ammonia vaporizer is a first ammonia vaporizer, the process comprising supplying the ammonia-containing wastewater to a second ammonia vaporizer where the ammonia-containing wastewater is vaporized and supplied as ammonia gas to a line upstream of the residual-gas cleaning apparatus or to the residual-gas cleaning apparatus.

4. The process of claim 1 wherein at least one of
the ammonia-containing wastewater is moved from the ammonia vaporizer to the residual-gas cleaning apparatus by way of a pump; or
a pressure of the ammonia-containing wastewater is increased before the ammonia-containing wastewater is supplied to the residual-gas cleaning apparatus.

5. The process of claim 1 comprising supplying the ammonia-containing wastewater from a region outside the nitric acid plant to the residual-gas cleaning apparatus.

6. The process of claim 1 wherein the ammonia vaporizer is a first ammonia vaporizer, the process comprising:
supplying the ammonia-containing wastewater from the first ammonia vaporizer to an ammonia stripper;
removing a portion of gaseous ammonia in the ammonia stripper and supplying the gaseous ammonia to the nitric acid plant; and
supplying the ammonia-containing wastewater from the ammonia stripper to a second ammonia vaporizer where the ammonia-containing wastewater is vaporized and supplied as ammonia gas to the residual-gas cleaning apparatus.

7. The process of claim 6 comprising at least one of
moving the ammonia-containing wastewater from the ammonia stripper by way of a pump to the residual-gas cleaning apparatus; or
increasing a pressure of the ammonia-containing wastewater before supplying the ammonia-containing wastewater to the residual-gas cleaning apparatus.

8. The process of claim 6 comprising:
combining the ammonia-containing wastewater from the first ammonia vaporizer with the ammonia-containing wastewater from the ammonia stripper; and
supplying a combination of the ammonia-containing wastewater from the first ammonia vaporizer with the ammonia-containing wastewater from the ammonia stripper to the second ammonia vaporizer where the combination is vaporized and supplied as ammonia gas to the residual-gas cleaning apparatus.

9. The process of claim 8 comprising:
at least one of moving the ammonia-containing wastewater from the first ammonia vaporizer by way of a first pump to the second ammonia vaporizer or increasing a pressure of the ammonia-containing wastewater from the first ammonia vaporizer;

at least one of moving the ammonia-containing wastewater from the ammonia stripper by way of a second pump to the second ammonia vaporizer or increasing a pressure of the ammonia-containing waster from the ammonia stripper; and thereafter supplying the ammonia-containing wastewater from the first ammonia vaporizer together with the ammonia-containing wastewater from the ammonia stripper to the residual-gas cleaning apparatus.

10. The process of claim 6 comprising supplying a combination of the ammonia-containing wastewater from the first ammonia vaporizer, the ammonia-containing wastewater from the ammonia stripper, and fresh ammonia from an external source to the second ammonia vaporizer where the combination is vaporized and supplied as ammonia gas to the residual-gas cleaning apparatus.

11. The process of claim 1 wherein the ammonia vaporizer is a first ammonia vaporizer, the process comprising:

admixing the ammonia-containing wastewater from the first ammonia vaporizer by way of a first pump with a fresh ammonia stream supplied from an external source to form a first admixture;

at least one of moving the first admixture to a second ammonia vaporizer or increasing a pressure of the first admixture;

admixing ammonia-containing wastewater from an ammonia stripper by way of a second pump with a fresh ammonia stream supplied from an external source to form a second admixture;

at least one of moving the second admixture to the second ammonia vaporizer or increasing a pressure of the second admixture; and thereafter supplying the ammonia-containing wastewater from the first ammonia vaporizer together with the ammonia-containing wastewater from the ammonia stripper to the residual-gas cleaning apparatus.

12. A plant for preparing nitric acid comprising:

a first ammonia vaporizer for vaporizing ammonia to produce an ammonia gas;

a plant section of a nitric acid plant that is in functional communication with the first ammonia vaporizer, wherein in the plant section of the nitric acid plant the ammonia gas is oxidized to nitrogen dioxide, which is absorbed in water to produce nitric acid;

a residual-gas cleaning apparatus disposed downstream of the plant section of the nitric acid plant, the residual-gas cleaning apparatus being in functional communication with the plant section of the nitric acid plant, wherein the residual-gas cleaning apparatus receives a residual gas containing nitrous gases from the plant section of the nitric acid plant and reduces the residual gas containing nitrous gases by way of ammonia; and a first line originating on an output side from the first ammonia vaporizer that receives ammonia-containing wastewater from the first ammonia vaporizer, the first line either opening upstream of the residual-gas cleaning apparatus into a second line that leads to the residual-gas cleaning apparatus, or leading directly to the residual-gas cleaning apparatus.

13. The plant of claim 12 comprising a second ammonia vaporizer disposed in the first line.

14. The plant of claim 13 comprising a pump disposed in the first line upstream of the second ammonia vaporizer.

15. The plant of claim 12 comprising an ammonia stripper that is disposed in a flow path of the first line between the first ammonia vaporizer and the residual-gas cleaning apparatus.

16. The plant of claim 15 wherein the ammonia stripper is disposed in the first line upstream of a pump.

17. The plant of claim 15 wherein the ammonia stripper is disposed in the first line upstream of a second ammonia vaporizer.

18. The plant of claim 12 comprising a second ammonia vaporizer disposed in the first line, wherein on the output side from the first ammonia vaporizer a third line for ammonia-containing wastewater leads to the second ammonia vaporizer, wherein on the output side from the first ammonia vaporizer the first line leads to an ammonia stripper, wherein on the output side from the ammonia stripper a fourth line for ammonia-containing wastewater leads to the residual-gas cleaning apparatus.

19. The plant of claim 18 wherein the third line and the fourth line open into a common line for ammonia-containing wastewater that leads to the residual-gas cleaning apparatus.

\* \* \* \* \*